(No Model.)
J. F. IVES.
PNEUMATIC TIRE FOR VEHICLE WHEELS.
No. 541,091. Patented June 18, 1895.
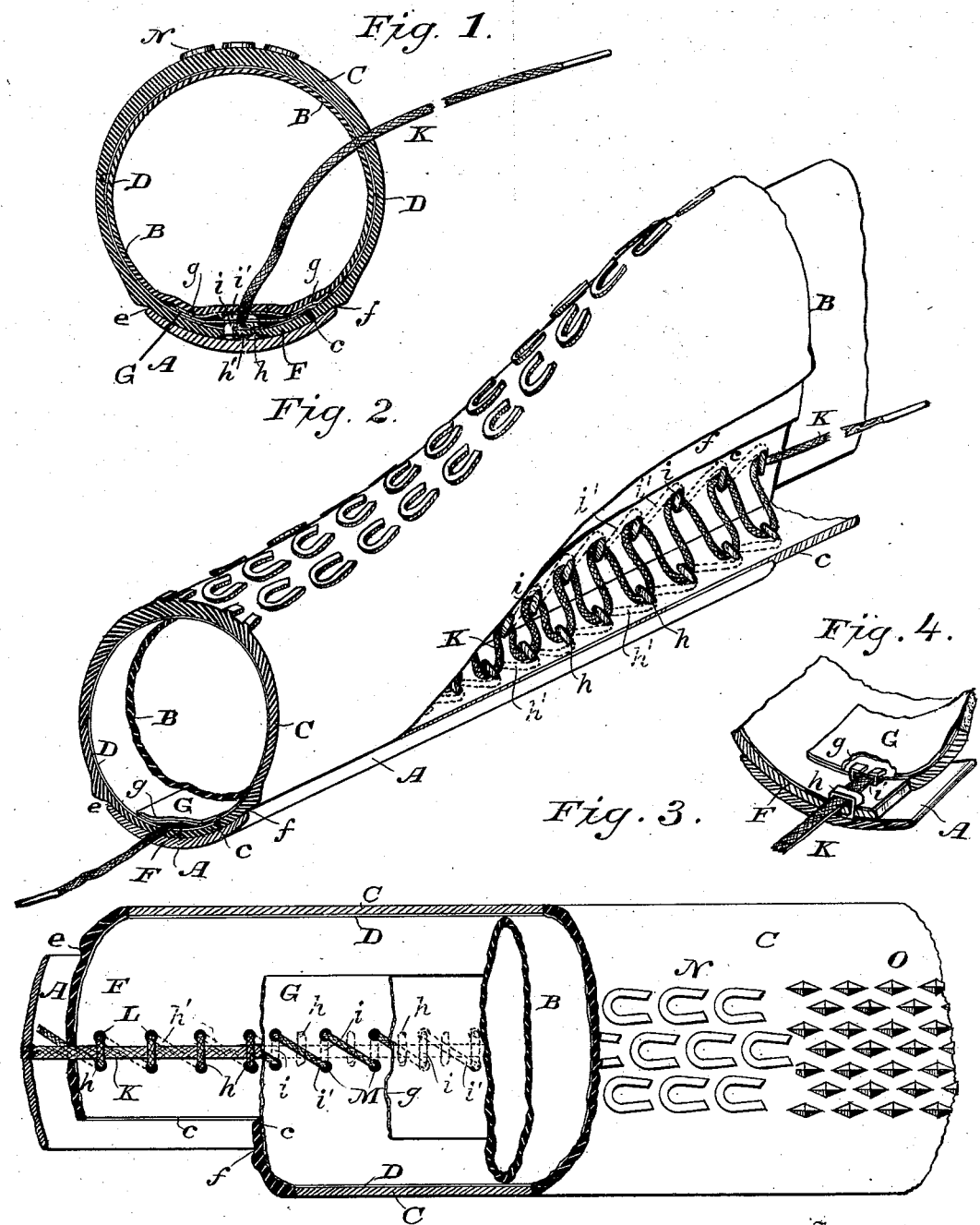

United States Patent Office.

JOHN F. IVES, OF CLEVELAND, OHIO, ASSIGNOR TO THE MECHANICAL RUBBER COMPANY, OF NEW YORK, N. Y.

PNEUMATIC TIRE FOR VEHICLE-WHEELS.

SPECIFICATION forming part of Letters Patent No. 541,091, dated June 18, 1895.

Application filed January 26, 1894. Serial No. 498,138. (No model.)

*To all whom it may concern:*

Be it known that I, JOHN F. IVES, a citizen of the United States, and a resident of Cleveland, in the county of Cuyahoga and State of Ohio, have invented certain new and useful Improvements in Pneumatic Tires for Vehicle-Wheels, of which the following is a specification that will enable those skilled in the art to which my invention pertains to make and use the same.

My invention relates to pneumatic tires of that class in which an interior air tube is protected by an outer sheath or covering. Its objects are to securely fasten this sheath to the rim of the wheel; to afford ready means of access to the air tube inclosed within it for repairs, &c., and to roughen that portion of the surface of the sheath which constitutes its tread by a regular pattern, raised or in relief thereon, to prevent slip of the wheel on the ground and also to leave a track or impression which shall be of a distinctive character and readily recognized, such a track being a good reminder that a wheel of a certain make has passed that way, and is therefore, of more or less value as an advertisement.

It consists of having the sheath longitudinally split or open on its inner side next to the rim, the slit being closed by flaps on the edges which lap past each other, one of these edges being securely cemented to the rim while the other is attached to it by means of a special lacing; and of its peculiar feature of roughened tread.

The accompanying drawings show my invention in the best form now known to me but many changes in the details might be made within the skill of a good mechanic without departing from the spirit of my invention as set forth in the claims at the end of this specification.

Figure 1 is a transverse sectional view of a pneumatic tire and wheel-rim embodying the features of my invention. Fig. 2 is a perspective view of the same, showing the parts of the pneumatic tire as partially forced into a distorted position to illustrate more clearly the lacing feature of the invention. Fig. 3 is a plan view of the same with some of the parts broken away to more clearly illustrate the construction of those lying beneath them. Fig. 4 is a perspective view illustrating a modification of my invention.

A, represents a wheel rim which may be constructed as shown or of any other desired section that can be used in connection with my tire.

B, is an inner air tube of rubber such as is ordinarily used in devices of this class.

C, represents the outer sheath or covering of the air tube split or opened at $c$, on the inner side next the rim. This sheath has a lining D, of canvas or any suitable textile fabric, cemented or properly vulcanized to it.

It will be observed that the split $c$, in the cover is somewhat to one side of the center and comes near the edge of the rim A, that portion of the cover from $c$, to $e$, constituting the flap F, and lying against the face of the rim, is securely and permanently cemented thereto. That portion of the other edge of the sheath extending from $c$, to $f$, may also be cemented to the rim but not necessarily as securely as the flap F, for this portion of the sheath is subject to disturbance and removal from the rim when access to the inner tube is desired. It will be observed that the lining D, of the casing extends beyond this edge of the sheath and constitutes a flap G, which extends past the abutting edges $c$, of the main portion of the sheath and laps or overlies the flap F, which is cemented to the rim. These two overlapping flaps are united by lacing in the manner shown in the drawings—that is, by means of a series of loops $h$, and $i$, so arranged on the adjacent meeting faces of the flaps that the loops of one set will be regularly interspaced with those of the other set. I prefer to form these loops as follows: In each flap there is a double row of perforations L, and M. Cords of any suitable texture are laced through these perforations in such manner that where they cross the outer or face surface of the flap they form the loops $h$, and $i$, extending transversely or at right angles to the general length of the tire, but on the backs of the flaps where they extend along the tire from one pair of perforations to another, they form diagonal loops $h'$, $i'$. As a result of this construction any extra strain which may be put upon the cross loops $h$, and $i$, tending to enlarge them beyond their normal size, will cause them to draw slack from the back or diagonal loops, which lying approximately in the general direction of the length of the tire, will have a tendency to constrict or reduce its diameter and bind it more firmly upon the rim of the wheel.

A cord or lacing string K, is alternately passed through the loops $h$, and $i$, of the series as clearly shown in the drawings and pulled taut to draw the loops of the two series into line and the adjacent faces of the flaps against each other, the meeting ends of the cord being tied or otherwise fastened. This will in effect secure the whole sheath to the rim for the loose flap G, is secured by lacing to the flap F, which is permanently secured to the rim by cement as before stated.

Instead of forming the loops on the meeting faces of the two flaps as before described, they may be made individual, that is, without connection with each other as shown by Fig. 4, and if so constructed may be composed of bent wire staples, soft woven or twisted cords, or of any suitable character of material that will answer for carrying out this feature of my invention. I prefer, however, to make these loops in the manner shown most clearly in Figs. 1 and 3.

The flap G, is preferably reinforced by a strip of canvas $g$, cemented or otherwise suitably connected to its outer side. This strip of canvas covers the diagonal loops $i'$, and protects the air tube from contact with or wear against them.

By attaching the protective sheath onto the wheel rim and lacing its lapping edges together in the manner described, I make a strong reliable fastening that offers ready access to the interior air tube for repairs without removing the sheath from the rim, and secure a construction that is neat in appearance, for all the loops, cords, &c., are between the two flaps entirely concealed from view and protected from dirt and wear; and further, by cementing one flap of the sheath securely to the rim, I overcome its tendency to creep longitudinally or detach itself from the rim; the combination of constructive features giving me the advantage of ready access to the inner tube found in some "mechanically attached" tires without their creeping tendency, and the permanency of setting found in the "hose pipe" or cemented tires, the interior of which is difficult of access.

The patterns which I form in relief on the tread side of the tire for the purpose hereinbefore stated, may be of any desired shape, but I prefer at present such forms as the small horse shoes shown at N, or the diamond figures shown at O, in Fig. 3; but whatever pattern is adopted, it should preferably be grouped or arranged in regular order on the tread and raised above the general surface thereof.

Having thus described my invention, what I claim as new and useful, and desire to secure by Letters Patent, is—

1. The sheath for a pneumatic tire split along its inner side, the edges forming flaps which lap past each other, one flap being permanently secured to the wheel rim and abutting at its edge against an annular rib or enlargement on the other flap, the meeting point being arranged adjacent one edge of the wheel rim, each flap provided with two parallel series of perforations, a cord laced diagonally through the two series of perforations of each flap forming diagonal loops, and a third cord laced through the loops of each flap, substantially as described.

2. The sheath for a pneumatic tire split along its inner side, the edges forming laps which pass each other and are each perforated with two rows of holes, cords laced through the holes of each lap to form transverse loops on the faces of the laps and diagonal loops on their backs, and a tie cord passing alternately through the transverse loops of both laps, substantially as described.

In testimony whereof I affix my signature, in the presence of two witnesses, this 8th day of November, 1893, at Cleveland, Ohio.

JOHN F. IVES.

Witnesses:
R. S. PIERCE,
G. E. LESLIE.